United States Patent [19]
Gaon

[11] 3,899,665
[45] Aug. 12, 1975

[54] TIMING ERROR DETECTION CIRCUIT

[75] Inventor: David E. Gaon, Villa Park, Ill.

[73] Assignee: GTE Automatic Electric Laboratories Incorporated, Northlake, Ill.

[22] Filed: Jan. 18, 1974

[21] Appl. No.: 434,744

[52] U.S. Cl. .... 235/153 A; 235/92 T; 340/146.1 R; 340/147 P
[51] Int. Cl.$^2$ .................... G05B 23/02; H03K 5/18
[58] Field of Search .......... 235/92 T, 92 EC, 153 R, 235/153 A; 328/120; 340/146.1 R, 146.1 F, 147 P

[56] References Cited

UNITED STATES PATENTS 3,399,351 8/1968 Reszka .......................... 328/120 X

OTHER PUBLICATIONS

Jenny, F. F., Missing Pulse Detector, in IBM Tech. Disc. Bull., 2(4): p. 66–67, Dec. 1959.

*Primary Examiner*—Malcolm A. Morrison
*Assistant Examiner*—R. Stephen Dildine, Jr.

[57] ABSTRACT

Timing error detection circuits for a subsystem controlled by common control apparatus includes a plurality of latch circuits which register timing pulses of the subsystem as the pulses occur and enables an error indication to be provided whenever one or more of the timing pulses fails to occur. The timing error detection circuits are described with reference to an application in a ticketing scanner unit in a communication switching system.

10 Claims, 2 Drawing Figures

PATENTED AUG 12 1975 3,899,665

TIMING ERROR DETECTION CIRCUIT

BACKGROUND OF THE INVENTION

1. Field of the Invention

This invention relates to communication switching systems including common control apparatus for controlling the operation of a plurality of peripheral units and more particularly, to a timing error detection arrangement for a peripheral unit in such system.

2. Description of a Prior Art

In common control communication switching systems the operation of a plurality of peripheral units is generally effected by data and instructions provided by common control apparatus of the system. At least certain ones of the peripheral units employ timing circuits responsive to commands provided by the common control apparatus to generate timing pulses for sequencing the operation of that peripheral unit.

In the event that one or more of the timing signals is not generated as the result of a malfunction in the peripheral unit, improper sequencing of the peripheral unit operation may result. Such improper sequencing will cause erroneous data to be provided.

Accordingly, it would be desirable to be able to determine if all of the timing signals have been generated and to be able to provide an error indication in the event that one or more of the timing signals is not generated.

SUMMARY OF THE INVENTION

Therefore, it is an object of the present invention to provide a method and apparatus for determining if timing signals required for sequencing the operation of a subsystem have been generated during a given operation cycle.

It is a further object of the invention to provide apparatus for monitoring the output of a subsystem timing pulse generator and for providing an indication whenever certain timing signals are not provided.

In a preferred embodiment, the method and apparatus for the present invention are employed in a common control communication switching system to enable monitoring of timing and control means of a ticketing scanner unit. The timing and control means is responsive to a command provided by common control means of the system to initiate the generation of a plurality of timing signals which sequence the operation of the ticketing scanner unit. As each timing pulse is generated for use in controlling the operation of the ticketing scanner unit, the signal is also registered in a timing pulse storage means. Prior to the completion of each operating cycle, the status of the timing storage means is determined and if one or more of the required timing signals has not been generated, an error means is enabled to provide a timing error signal for transmission to the common control means.

In the event the timing error signal is generated, the common control means is operable to effect diagnostic routining of the ticketing scanner unit to determine the source of the malfunction. Each of the required timing signals is stored in a separate data storage location of the timing storage means to enable the common control means to determine which of the timing signals has not been generated.

CROSS-REFERENCES TO RELATED APPLICATIONS AND PATENTS

The scanner for the local automatic message accounting subsystem is disclosed in patent application Ser. No. 434,743, filed Jan. 18, 1974 by B. F. Gearing, M. R. Winandy, G. Grzybowski and D. F. Gaon, and in two articles in the GTE Automatic Electric Journal, Vol. 13, No. 4 (October, 1972) at pages 177,177–and pages 185–196.

The above patent applications, and articles are incorporated herein and made a part hereof as though fully set forth.

DESCRIPTION OF A PREFERRED EMBODIMENT

Figures 1, 2:
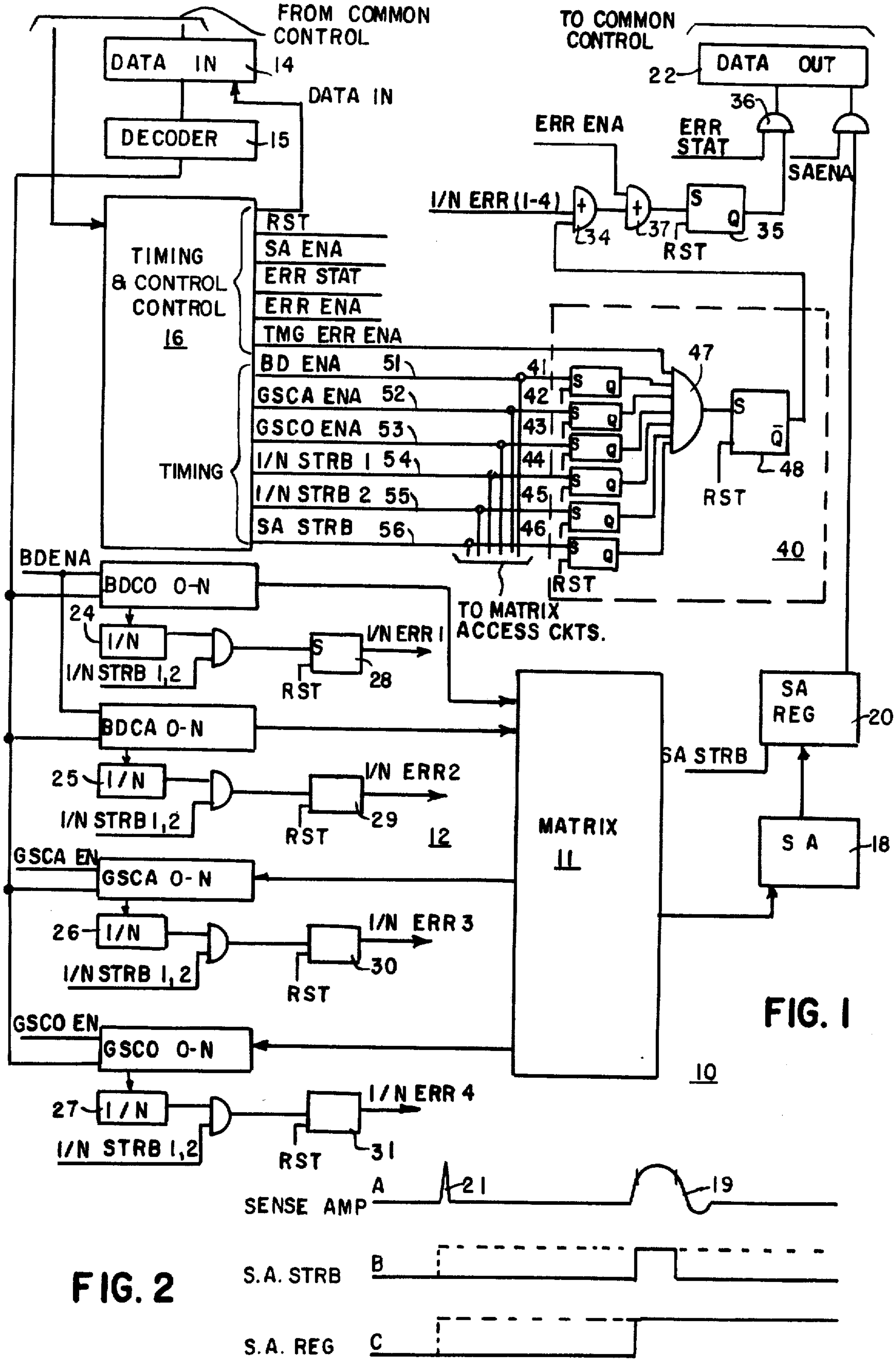
FIG. 1 is a block diagram of a ticketing scanner unit which employs the timing signal error circuits provided by the present invention.
FIG. 2 is a timing diagram showing waveforms of signals employed in the scanner unit shown in FIG. 1.

In the copending application U.S. Ser. No. 434,743 of B. F. Gearing et al, which is entitled "Addressable Ticketing Scanner", and in the two articles referenced above there is disclosed an addressable ticketing scanner unit which is employed in a communication switching system to to effect the interrogation of scan points associated with busy paths established through a switching network of the system in accordance with address data supplied by common control apparatus.

Referring to FIG. 1, the scan points such as CX are arranged in a matrix 11. The status of pre-selected scan points of the matrix 11 are interrogated by selectively enabling matrix access circuits indicated generally at 12. AS is more fully disclosed at page 188 of the GTE Automated Electric Technical Journal, Vol. 13, No. 4 (October, 1972) referenced above, the matrix access circuits 12 include a plurality of core current drivers BDCO and a plurality of core current sinks GSCO. A given group of scan points is selected for interrogation in response to enabling one of the current source drivers BDCO and one of the ground sink drivers GSCO. In addition, the matrix access circuits 12 include a plurality of cable battery drivers BDCA and a plurality of cable sink drivers GSCA provided to minimize the effects of cable capacitance.

A given one of the current drivers BDCO, such as driver BDCO-O, and a given one of the current sink drivers GSCO, such as driver GSCO-O, are selected in response to address data supplied to the ticketing scanner unit 10 by the common control apparatus. The address data is received by a data in register 14 which receives address data supplied by the common control apparatus and provides enabling signals for the current driver BDCO and ground driver GSCO designated by such address. The address data also indicates which of the cable source and ground driver circuits BDCA and GSCA are to be enabled for a given scan operation.

The ticketing scanner unit 10 further includes timing and control circuits 16 responsive to an instruction provided by the common control apparatus along with the address data to generate a plurality of timing signals for sequencing the operation of the ticketing scanner unit 10 during each scan operation. The timing signals generated by the timing and control circuit 16 include signals BDEN, GSCO EN and GSCA EN which are used to effect sequential enabling of the current drivers BDCO, BDCA and ground drivers GSCO and GSCA.

The sequence of operations of the ticketing scanner unit 10 for a normal scan operation are more fully disclosed at page 189 of the GTE Automated Electric Technical Journal referenced above. Briefly, a scan operation is initiated when the common control apparatus sends a command indicating a scan operation is to be performed to the ticketing scanner unit 10. The common control apparatus also sends address data which designates which of the battery driver circuits BDCO, BDCA and ground driver circuits GSCO, GSCA are to be enabled. The command is received by the timing and control circuits 16 which responsively initiate the generation of timing pulses which thereafter control the sequencing of the operation of the ticketing scanner unit 10. The address data is gated into the data in register 14 in response to a first timing pulse data in ENA. The outputs of the data in register 14 are decoded by decoder circuit 15 which provides output for permitting enabling of the designated driver circuits BDCO, BDCA, GSCO and GSCA in response to timing signals provided by the timing and control circuits 16.

Thereafter, a timing signal BD ENA enables the designated battery driver circuits BDCO, BDCA. The designated ground drivers GSCO and GSCA are enabled in response to further timing pulses GSCO ENA and GSCA ENA which are provided by the timing and control circuits 16.

During a given scan operation, when the battery driver BDCO and ground driver GSCO are enabled to effect the interrogation of a given set of scan points of the matrix 11, output data, indicating the status of the scan point being interrogated is extended to a sense amplifier 18. Thereafter, in response to a further timing pulse SA STRB, the outputs of the sense amplifier 18 are gated into a sense amplifier register 20.

At the end of the scan operation, the data stored, in the sense amplifier register 20 is gated to a data out multiplexer 22 in response to a signal SA ENA provided by the timing circuits 16 and is transmitted to the common control apparatus.

The ticketing scanner unit 10 includes self-checking circuits which permit the detection of malfunctions in the circuits of the scanner unit 10 and a provision of error indication for transmission to the common control apparatus, For example, the scanner unit 10 includes one out of N check circuits 24–27 associated with the driver circuits BDCO, BDCA, GSCA, and GSCO, respectively. Each one out of N circuit, such as one out of N circuit 24 is operable during each scan operation to provide an error output signal whenever more than one of the associated driver circuits BDCO-O through BDCO-N is enabled during a given scan operation or whenever none of the driver circuits BDCO is enabled at the proper time during a given scan operation. It is apparent that were more than one driver circuits of a given group, such as driver circuit BDCO, were enabled during a given scan operation, two groups of scan points would be interrogated simultaneously and erroneous output data would be provided.

The status of the one out of N check circuits 24–27 is determined twice during each scan operation in response to timing signals 1-N STRB 1 and 1-N STRB 2, which are provided by the timing and control circuits 16. The strobe signals 1-N STRB 1 and 1-N STRB 2 enable latch circuits 28–31 associated with the one out of N circuits 24–27 to be set whenever the corresponding one out of N check circuits 24–27 are indicating an error condition exists. The outputs of the latch circuits 28–31 are extended over an OR gate 34 and an AND gate 37 to a device error latch circuit 35. A second input of gate 37 receives a signal ERR ENA provided by timing circuit 16. The latch circuit 35 is set when signal ERR ENA is provided if an error is indicated by any of the one out of N check circuits 24–27.

The scanner unit 10 further includes a timing signal register circuit 40 which includes a plurality of latch circuits 41–46 each of which is individually connected to a different output of the timing circuit 16. For example, latch circuit 41 is connected to an output 51 of the timing circuit 16 to receive the signal BD ENA. Latch circuits 42 and 43 are connected to outputs 52 and 53 of the timing circuit 16 to receive signals GSCA EN and GSCO EN, respectively. Latch circuits 44 and 45 are connected to outputs 54 and 55 of the timing circuit 16 to receive signals 1-N STRB 1 and 1-N STRB 2, respectively. Also, latch circuit 46 is connected to output 56 of the timing circuit 16 to receive a signal SA STRB.

Latch circuits 41–46 serve to indicate whether any of the six timing pulses is "continuously on" and that all six timing pulses have been provided during a given scan.

For example, referring to FIG. 2, the output of the sense amplifier 18 is shown in line A the pulse 19 represents a normal data pulse and the pulse 21 represents a noise pulse. To minimize noise interference, the output of the sense amplifier 18 is strobed by the signal SA STRB, FIG. 2, line B, to permit the output data to be gated into the sense amplifier register 20 as indicated in line C, FIG. 2, at a point in the scan operation when the data is expected to be present at the output of the sense amplifier 18.

In the event the signal SA STRB is continously provided due to a malfunction, as indicated by the dotted line, FIG. 2, line B, the sense amplifier register 20 may erroneously be set by the noise pulse 21 as indicated by the dotted line in line C, FIG. 2.

In such condition, the signal SA ENA would be "continuously on" and for a given scan cycle the corresponding latch circuit 46 would not be set. The latch circuits 41–46, which require the leading edges of the timing pulses to be set, serve to indicate whether a given timing pulse was continuously on or was not provided during a given scan cycle.

As the six timing signals indicated above are generated by the timing circuit 16, the respective latch circuits 41–46 are set as the corresponding timing signal is provided. The outputs Q are extended to inputs of an AND gate 47 which has a further input connected to receive a further signal TMG ERR EN provided by the timing and control circuits 16. If all of the six timing signals are provided, the output of AND gate 47 provided when signal TMG ERR EN is generated sets a timing error latch 48. The false output Q of the error latch 48 is connected to an input of gate 34. Accordingly, if all of the timing signals have been provided during a given scan operation, timing error latch 48 is set so that if there are no other errors, the device error latch 35 is not set when the error enable signal is provided. On the other hand, if one of the six timing signals has not been provided, the timing error latch 48 is not set, and accordingly, the error latch 35 is set when the signal ERR ENA is provided The output of the error latch 35 is connected over the error status gate 36 to the input of the data output multiplex 22. The status of the error latch 35 is scanned when a signal ERR STAT is provided by the timing circuit 16 is permit the error status to be transmitted to the common control apparatus.

I claim:

1. In a communication switching system including at least one peripheral unit and a common control means for supplying data and commands to said peripheral unit, said peripheral unit including timing means responsive to a command provided by said common control means to generate a plurality of timing signals for sequencing the operation of said peripheral units, a method for detecting timing errors in said peripheral unit comprising:

registering at least certain ones of said timing signals as said timing signals are generated during a given operation cycle, wherein registering said certain timing signals includes enabling a different latch circuit to provide a first output as each of said certain timing signals is generated whereby said latch circuits provide a first set of outputs whenever all of said certain timing signals are generated and a different set of outputs whenever one or more of said certain timing signals fails to be generated.

2. A method as set forth in claim 1 wherein determining that each of said certain timing signals has been generated includes combining the outputs of said latch circuits and enabling a further latch circuit when all of said latch circuits provide said first output.

3. A method as set forth in claim 2 wherein providing an error indication includes gating an output provided by said further latch circuit to enable an error circuit to provide an error signal.

4. A method as set forth in claim 3 which includes transmitting said error signal to said common control means.

5. In a communication switching system including at least one peripheral unit and a common control means for supplying data and commands to said peripheral unit, said peripheral unit including timing means responsive to a command provided by said common control means to generate a plurality of timing signals for sequencing the operation of said peripheral unit, a timing error detection arrangement comprising: timing signal register means for storing at least certain ones of said timing signals as said certain timing signals are generated during a given operating cycle of said peripheral unit, said timing signal register means comprises a plurality of first latch circuits including an individual latch circuit corresponding to each of said certain timing signals, each of said latch circuits being set in response to the generation of the corresponding timing signal, timing error means, and enabling means enabled during said given operating cycle for controlling said timing error means to provide an error indication whenever one or more of said certain timing signals fails to be generated during said given operations cycle of said peripheral unit.

6. A timing error detection arrangement as set forth in claim 5 wherein said timing error means comprises a second latch circuit which is set by said enabling means whenever all of said certain timing signals are generated during said given operating cycle.

7. A timing error detection arrangement as set forth in claim 6 wherein said enabling means comprises gating means having a plurality of inputs individually connected to outputs of said first latch circuits, a further input connected to an output of said timing means, and an output connected to a control input of said second latch circuit, said gating means being enabled by a further timing pulse provided by said timing means being enabled by a further timing. pulse provided by said timing means after said certain timing pulses have been generated.

8. A timing error detection arrangement as set forth in claim 7 wherein said timing means generates a signal for resetting said first and second latch circuits after each operating cycle.

9. A timing error detection arrangement as set forth in claim 8 which includes error indication means enabled by said timing error latch means to provide an error signal for transmission to said common control means.

10. A timing error detection arrangement as set forth in claim 5 wherein said first latch circuits are set by the leading edges of said certain timing pulses whereby a given first latch circuit remains reset whenever the corresponding timing signal is continuously generated.

* * * * *